United States Patent [19]

Adams

[11] Patent Number: 5,465,258

[45] Date of Patent: Nov. 7, 1995

[54] BINARY IMAGE PERFORMANCE EVALUATION TOOL

[75] Inventor: Steven E. Adams, Acton, Mass.

[73] Assignee: Integrity Systems, Inc., Belmont, Mass.

[21] Appl. No.: 29,366

[22] Filed: Mar. 9, 1993

Related U.S. Application Data

[63] Continuation of Ser. No. 435,615, Nov. 13, 1989, abandoned.

[51] Int. Cl.[6] ................................................. G06F 11/34
[52] U.S. Cl. ............... 395/700; 395/183.11; 395/183.14; 395/184.01; 364/267; 364/267.4; 364/285; 364/DIG. 1
[58] Field of Search .................... 395/500, 575, 395/650, 700; 371/15.1, 16.2, 16.3, 19; 364/267, 267.2, 267.4, 285

[56] References Cited

U.S. PATENT DOCUMENTS

| | | | |
|---|---|---|---|
| 3,702,005 | 10/1972 | Ingalls, Jr. | 444/1 |
| 3,763,474 | 10/1973 | Freeman et al. | 340/172.5 |
| 4,435,759 | 3/1984 | Baum et al. | 395/250 |
| 4,720,778 | 1/1988 | Hall et al. | 364/200 |
| 4,819,233 | 4/1989 | Delucia et al. | 371/19 |
| 4,821,178 | 4/1989 | Levin et al. | 364/200 |
| 4,845,615 | 7/1989 | Blasciak | 364/200 |
| 5,103,394 | 4/1992 | Blasciak | 395/575 |

OTHER PUBLICATIONS

Myers, Ben, "Quaid Analyzer", PC Tech Journal, v. 6 N. 1, Jan. 1988, pp. 1–3.
Bentley, Jon, "Profilers", Comm. of the ACM, v. 30 N. 7, Jul. 1987, pp. 1–8.
Fisher, Joseph, A., "Trace Scheduling: A Technique for Global Microcode Compaction", IEEE Trans. on Computers, v. c–30 N. 7, Jul. 1981, pp. 478–490.

*Primary Examiner*—Kevin A. Kriess
*Assistant Examiner*—Dennis M. Butler
*Attorney, Agent, or Firm*—Choate, Hall & Stewart

[57] ABSTRACT

A system and method for evaluating the performance of a computer program, or software performance evaluation tool. The system comprises an analyzer module for analyzing a binary image of said program and making modifications necessary to measure performance; a kernel for measuring and storing runtime performance information; and a post processor for processing said runtime performance information, correlating it with static information, and displaying resulting information to a user. The analyzer determines boundaries of a plurality of regions and routines within the binary image and inserts breakpoints at the boundaries. The analyzer also examines the binary image of a computer program instruction by instruction in order to instrument and bind the binary image to the kernel module, and uses an abstraction of a target computer in order to instrument the computer program.

7 Claims, 7 Drawing Sheets

PROGRAM SIGNATURE FILE

| |
|---|
| VERSION NUMBER OF TOOL SET |
| DATE AND TIME THIS FILE WAS CREATED |
| TARGET COMPUTER NAME |
| ARCHITECTURE DESCRIPTION FILE NAME |
| ARCHITECTURE DESCRIPTION FILE 16-BIT CRC |
| ARCHITECTURE DESCRIPTION FILE SIZE |
| ARCHITECTURE DESCRIPTION FILE TIME STAMP |
| TARGET PROGRAM (SOURCE) FILE NAME |
| TARGET PROGRAM (SOURCE) 16-BIT CRC |
| TARGET PROGRAM (SOURCE) FILE SIZE |
| TARGET PROGRAM (SOURCE) TIME STAMP |
| TARGET PROGRAM (MODIFIED) FILE NAME |
| TARGET PROGRAM (MODIFIED) 16-BIT CRC |
| TARGET PROGRAM (MODIFIED) FILE SIZE |
| TARGET PROGRAM (MODIFIED) TIME STAMP |
| KERNEL PROGRAM FILE NAME |
| KERNEL PROGRAM 16-BIT CRC |
| KERNEL PROGRAM FILE SIZE |
| KERNEL PROGRAM TIME STAMP |

FIG. 15

BINARY IMAGE PERFORMANCE EVALUATION TOOL

This is a continuation of application Ser. No. 07/435,615 filed on Nov. 13, 1989, now abandoned.

BACKGROUND OF THE INVENTION

The invention relates to evaluating the runtime performance of a computer program.

A digital data processing system is an integrated set of hardware and software, i.e., physical devices which make up a computer, and algorithms and data structures which make up computer programs. Such a system is capable of storing and executing data and operations necessary to complete a given task.

Generally, a computer programmer defines a computer program using the operations and data structures of a high level programming language, e.g., FORTRAN, C, or Modula-2. The programming language provides primitive operations, e.g., add and store, that are organized into algorithms according to sequence control operations, e.g., if then, while, and goto, to manipulate various data, e.g., numbers and characters, in the data structures. Such a definition of a program is referred to as the source code of the program.

Next, the programmer submits the source code to a compiler which creates object code from the source code. A linker then links the object code with other object code, e.g., object code from other modules written by the programmer, or object code from library routines, to create executable code, i.e., a binary image.

Performance evaluation tools monitor a computer program to see how often and under what circumstances its operations execute according to a variety of criteria, e.g., execution counts and execution times. Previous performance evaluation systems and methods, "profilers," require either access to the source code of the computer program or to be compiled and linked with the computer program before execution. Profilers requiring access to source code are generally statistical in nature. Over long periods of time, they monitor a program as it executes, periodically generate an interrupt, and record the contents of various registers. Profilers that are compiled and linked into the source code of a computer program generate runtime calls to an outside routine which records various statistics.

SUMMARY OF THE INVENTION

The invention is a digital data processing system for evaluating the performance of a computer program. The system comprises an analyzer module for analyzing a binary image of said program and making modifications necessary to measure performance; a kernel for measuring and storing runtime performance information; and a post processor for processing said runtime performance information, correlating it with static information, and displaying resulting information to a user. The analyzer determines boundaries of a plurality of regions and routines within the binary image and inserts breakpoints at the boundaries. The analyzer also examines the binary image of a computer program instruction by instruction in order to bind the binary image to the kernel module and uses an abstraction of a target computer in order to evaluate performance of the computer program. The kernel executes in real time, concurrent with execution of said program.

The method for evaluating the performance of a computer program comprises the steps of analyzing a binary image of the program and making modifications necessary to measure performance; measuring and storing runtime performance information; and processing the runtime performance information, correlating it with static information, and displaying resulting information to a user. The method for analyzing the binary image of a computer program comprises the steps of determining boundaries of a plurality of routines in the program; determining boundaries of a plurality of regions within the routines; and determining boundaries at which the flow of control in said program changes. The method further comprises the step of examining a binary image of a computer program instruction by instruction in order to bind said binary image.

In general, the invention is a software performance evaluation tool that is desensitized to source code language and architecture of computer, i.e., it does not require access to the source code of the program which it is analyzing. Other advantages and features will become apparent from the following description, and from the claims.

DESCRIPTION OF THE PREFERRED EMBODIMENTS

FIG. 15 is a functional block diagram that shows the program signature file created and used by the system.

The present invention relates to evaluating the performance of a particular computer program on a particular computer, referred to respectively as the target program and the target computer. Given a binary image, i.e., an executable version of the target program, and an architecture description file (ADF), i.e., certain characteristics of the target computer, the system measures various performance criteria, e.g., execution count and execution time for each routine in the program. One advantage of the system is that it does not require access to the source code or any compilation specific information. A second advantage of the system is that it can be used on any target computer defined by an ADF.

Figure 1:
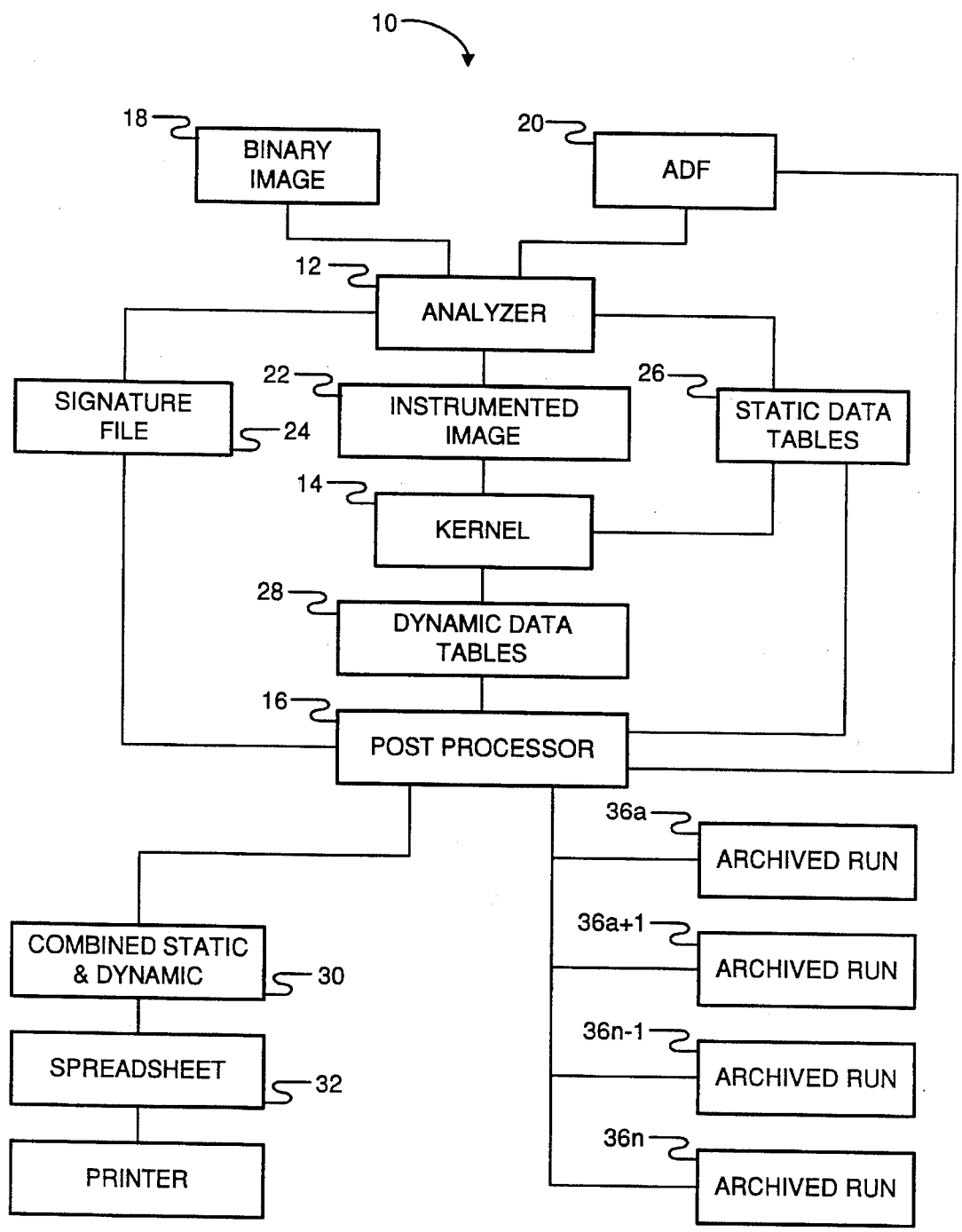
FIG. 1 is a functional block diagram of the components of a digital data processing system according to the present invention.

Referring to FIG. 1, a digital data processing system 10 of the present invention includes an analyzer module 12, a kernel module 14, and a post processor module 16. In order to evaluate the performance of a target program on a target computer, a user invokes the analyzer module 12 on a computer referred to as the host computer (which may or may not be the same computer as the target computer) and provides it with a binary image 18 of the target program and an architecture description file (ADF) 20 which describes various characteristics of the target computer. The analyzer module 12 reads the binary image 18 and the ADF 20 and uses them to create an instrumented image 22 of the binary image 18, a program signature file 24, and static data tables 26.

When the analyzer module 12 completes its operations, the kernel module 14 is automatically executed on the target computer concurrent with the execution of the instrumented image 22. As the instrumented image 22 executes, the kernel module 14 collects various performance information and stores it in dynamic data tables 28.

When the execution of the kernel module 14 and instrumented image 22 is complete, the post processor module 16 executes on the host computer. The post processor module 16 combines the contents of the static data tables 26 and dynamic data tables 28, and stores results in a combined data table 30 which the user can later submit to a conventional spreadsheet package or database package 32. The post processor module 16 further stores the combined data table 30 as one of a series of archived data tables 36a–36n so that the performance of one target program can be compared to the performance of another.

A detailed description of each of the three modules and their associated data structures and files follows.

The Analyzer Module

In order to analyze the binary image 18 of a target program without having access to the source code, the analyzer takes apart the binary image 18 by examining each instruction, beginning with the instruction at the entry point of the target program, i.e., the starting address of the executable code, and copying each to a file which is the instrumented image 22.

Further, in proceeding from one instruction to the next, the analyzer module 12 encounters all of the routines within the binary image 18 that are to be tracked and evaluated. When the analyzer module 12 encounters a reference to a routine in the binary image 18, it inserts tracking code, i.e., interrupts or calls which lead to routines in the kernel module 14, so that the instrumented image 22 is bound to the kernel module 14. That is, when the instrumented image 22 is executed and it encounters a routine, control transfers to the kernel module 14 which records various data about this execution of the routine and then returns control to the instrumented image 22.

When invoking the analyzer module 12, the user chooses whether to link the instrumented image 22 to the routines in the kernel 14 using space efficient linkages (e.g., interrupts such as INT 3 on a computer having an 8086 architecture) or time efficient linkages (e.g., direct subroutine calls into the kernel). Additionally, the user may permit the analyzer module 12 to select the linkage routine to be used.

At the same time, the user also chooses which program characteristics to evaluate, which the analyzer 12 stores as switch settings in static data tables 26. These characteristics include: exclusive/inclusive execution times per routine (minimum/maximum/average/total times, total execution count), exclusive/inclusive execution times per path (minimum/maximum/average/total times, total execution count), recent event history (an adjustable size calling history of the program in a form for playback during post-processing), task and interrupt handling (minimum/maximum/average/total suspension time, total suspension count).

Since the system 10 operates independently of the particular target computer, it uses an abstract model of the target computer, i.e., the ADF, the structure of which is described below.

Architecture Description File (ADF)

The purpose of the architecture description file (ADF) 20 is to characterize the target computer, to control how the analyzer 12 looks at the binary image 18, and to determine the structure of the static data tables 26 generated by the analyzer. The ADF 20 is an abstract model of the data representation used by a computer architecture, specifically of arithmetic elements and storage unit sizes, e.g., 16 bit integers or 32 bit integers.

Figure 2:
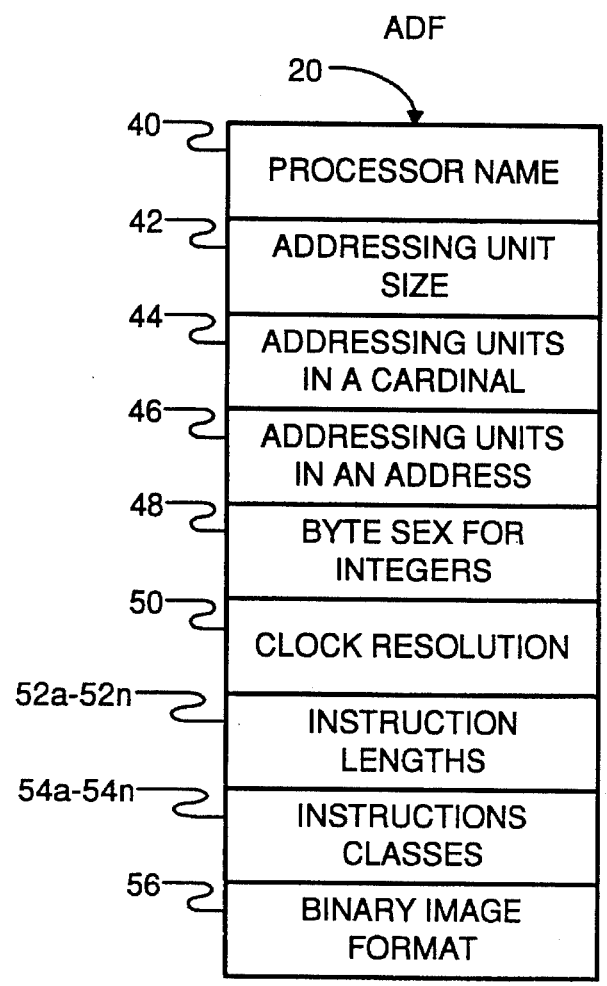
FIG. 2 is a functional block diagram that shows the architecture description file (ADF) used by the system.

Referring to FIG. 2, the ADF contains a number of fields, the contents of which identify parameters that define a computer architecture, including a processor name field 40, an addressing unit size field 42, e.g., byte or word, an addressing units in a CARDINAL field 44, addressing units in an ADDRESS field 46, a byte sex for integers field 48, a clock resolution field 50. The ADF 20 also includes fields for instruction set parameters such as instruction lengths 52a–52n and instruction classes 54a–54n, and fields for binary image parameters such as a binary image format 56.

The contents of the ADF 20 direct the analyzer 12 how to read the binary image 18 and determine in part the contents of the static data tables 26, which are described next in connection with FIGS. 3–15.

Static Data Tables

From the binary image 18, the analyzer 12 generates the several static data tables which are written to a single file, referred to here as the static data tables 26.

Figure 3:
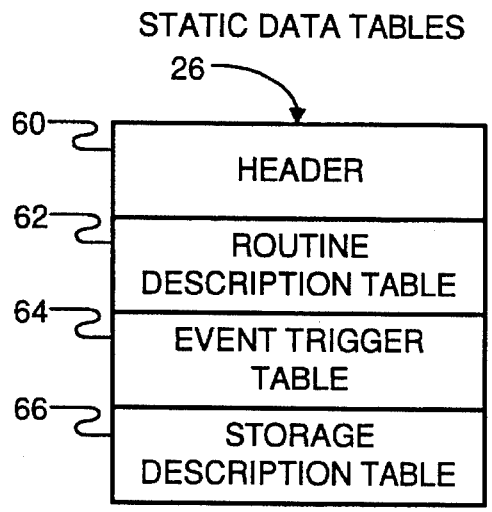
FIG. 3 is a functional block diagram that shows the static data file created and used by the system.

Referring to FIG. 3, the static data tables 26 contain a header 60, the contents of which indicate the location of the various tables; a routine description table 62; the contents of which identify the location of each routine in the instrumented image 22 and the various statistics gathered for each; an event triggers table 64 the contents of which identify at what events to collect the statistics on the routines; and a storage description table 66, the contents of which identify the necessary links between the instrumented image 22 and the kernel 14. Each of these tables is described in detail below in connection with FIGS. 3–15.

The header 60 contains several fields, the contents of which indicate the location of the various tables in the static data tables 26, including a version number field, the contents of which are a major version number times 256 plus a minor version number (both are constrained to be between 0 and 255); a RTOffset field; the contents of which identify the number of addressing units (bytes or words) from the address of the version number to the start of the routine description table; a RTEntries field, the contents of which identify the number of routine description entries in the routine description table; a SDOffset field, the contents of which identify the number of addressing units from the address of version number to the start of the Storage Description Table 66; a SDEntries field, the contents of which identify the number of entries in the storage description table 66; an ETOffset field, the contents of which identify the number of addressing units from the address of version number to the start of the Event Triggers Table 64; an ETEntries field, the contents of which identify the number of entries in the Event Triggers Table 64; a number of GlobalFlags fields, the contents of which are set and used by the kernel to indicate states such as table overflow.

Routine Description Table

The routine description table 62 contains routine description entries, one for each routine identified in the binary image 18 by the analyzer 12.

Figure 4:
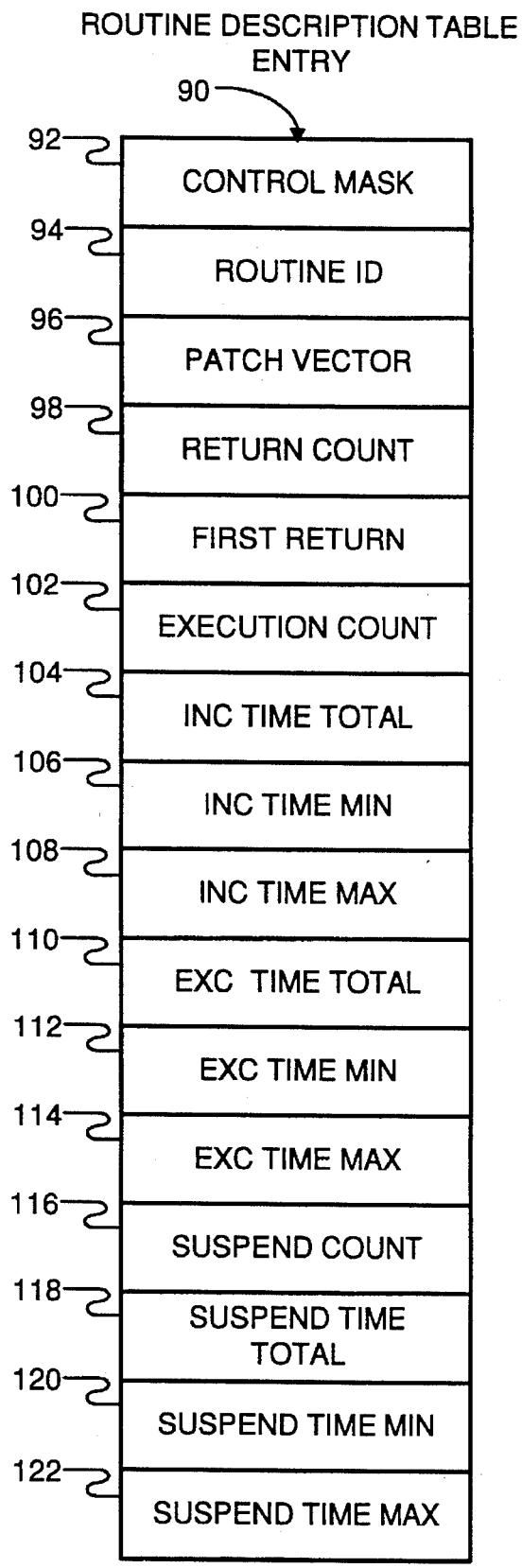
FIG. 4 is a functional block diagram that shows a routine description table entry of the routine description table of the static data file created and used by the system.

As shown in FIG. 4, the routine description entry 90 contains a number of fields (some of which are mandatory, others of which are optional), including a control mask field 92, the contents of which are set by the analyzer module 12 and control the remaining fields in the entry 90. The control mask field 92 is a power set to determine which of the optional fields are present. It includes a sign bit, the contents of which indicate what type of tracking is active for the routine (tracking execution times or tracking suspension times). Another bit is set if the routine marks the start of a task. Tasks, in turn, are used to track suspension times.

The routine description entry 90 also includes a routine ID field 94, the contents of which are the address of the routine, which serves as the name at runtime. This name can be mapped to a symbol either by the post-processor 16 or from a load map, if one is available.

The routine description entry 90 also includes a patch vector field 96, the contents of which are an offset within the Storage Description Table 66, to an array which contains the code removed from the start of the routine in order to insert the instrumentation code.

The routine description entry 90 also includes a return count field 98, the contents of which are the number of returns patched into the instrumented image 22, a first return field 100, the contents of which are an offset into the Storage Description Table 66 for the patched return code, and a number of statistics fields 102–122, the contents of which identify the various statistics gathered for the routine.

Event Triggers Table

Figure 5:
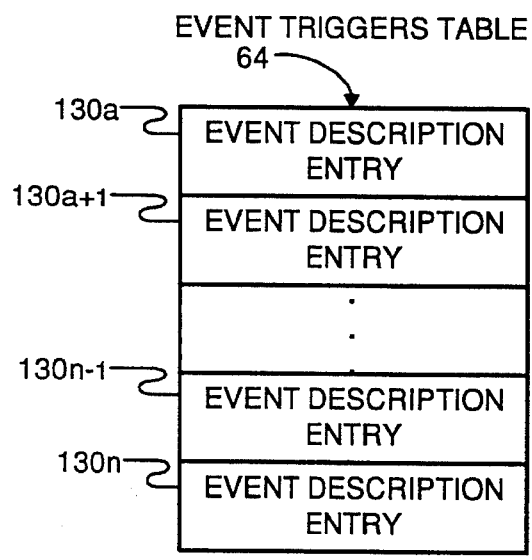
FIG. 5 is a functional block diagram that shows the event triggers table of the static data file created and used by the system.

The static data tables 26 also include an Event Triggers Table 64 which is an ordered sequential list of trigger events specified by the user that cause the kernel 14 to start or stop an action, e.g. counting executions. Referring to FIG. 5, the event triggers table contains a number of event description entries 130a–130n.

Figure 6:
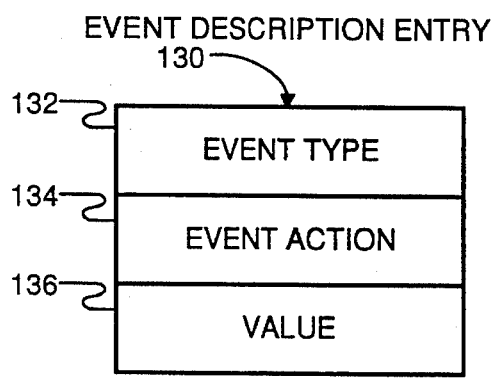
FIG. 6 is a functional block diagram that shows the event description entry of the event triggers table of the static data file created and used by the system.

Referring to FIG. 6, the event description entry 130 contains several logical fields including an event type field 132, the contents of which indicate at what intervals to track an event or perform an action. For example, absolute type indicates tracking an event at an absolute time from the start of execution; cycle type starts tracking at every n clock ticks; path type performs an action on path entry or exit; and routine type performs an action on routine entry or exit.

The event description entry 130 also includes an event action field 134, the contents of which indicate what action to take in tracking an event. For example, record the time when an event occurs, or start tracking time, or stop tracking time, or track this event to the end of the event.

The event description entry 130 also includes a value field 136, the contents of which vary depending on the contents of the type field 132. For example, absolute value indicates absolute clock time; cycle value indicates delta clock time; path value indicates an offset into Storage Description Table 66 for a path name; routine value indicates an offset into the Routine Description Table 62 for a routine name.

Storage Description Table

Figure 7:
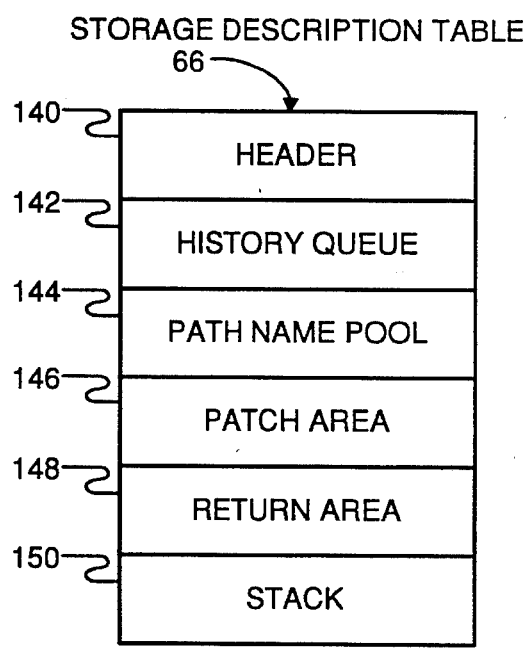
FIG. 7 is a functional block diagram that shows the storage description table of the static data file created and used by the system.

Referring to FIG. 7, the storage description table 66 contains the space for data to be collected when the kernel must keep the statistics in memory; it holds the path names which are used as triggers for the events; and it holds the scratch space needed by the kernel.

The storage description table 66 contains several fields, including a header field 140, the contents of which indicate the location of other fields in the table; a history queue field 142, the contents of which describe the calling tree of the binary image 18; a path name pool field 144, the contents of which identify the names of routines and paths in the binary image 18; a patch area field 148, the contents of which identify the displaced instructions of the binary image 18; and a return area field 148, the contents of which contain a number of return area entries.

Figure 8:
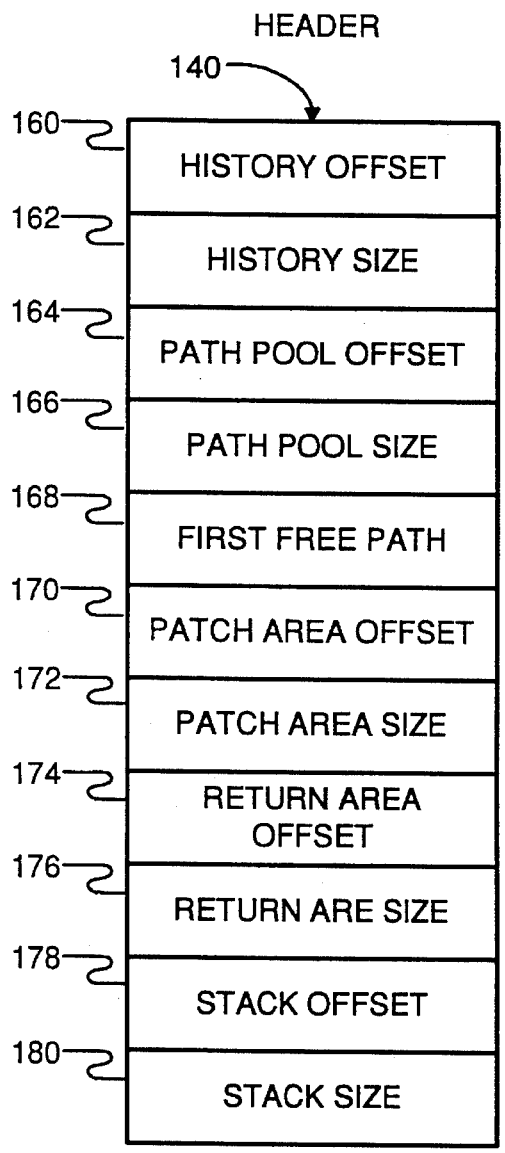
FIG. 8 is a functional block diagram that shows the header of the storage description table of the static data file created and used by the system.

Referring to FIG. 8, the header 140 in the storage description table 66 contains several fields, including a history offset field 160, the contents of which identify an offset to the history queue field 142; and a history size field 162, the contents of which identify the number of entries in the history queue field 142. The same respective items are identified by the path pool offset field 164, the path pool size field 166, the patch area offset field 170, the patch area size field 172, the return area offset field 174, the return area size field 176, the stack offset field 178, and the stack size field 180. The header 140 also contains a first free path field 168, the contents of which indicate the number of unused entries in the path name pool field 144.

Figure 9:
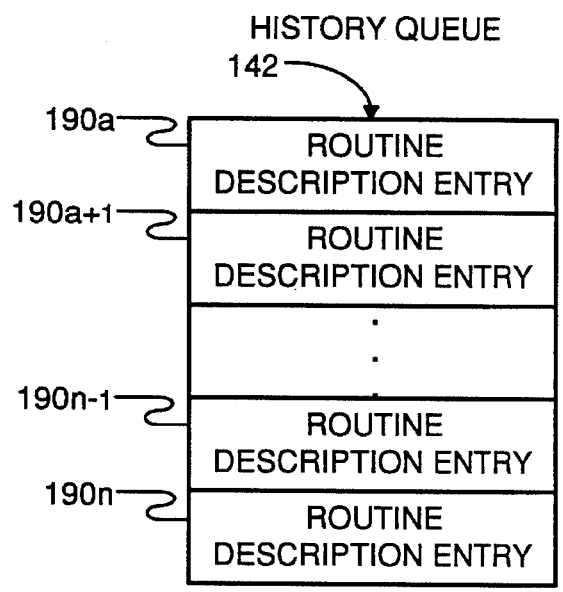
FIG. 9 is a functional block diagram that shows the history queue of the storage description table of the static data file created and used by the system.
Figure 10:
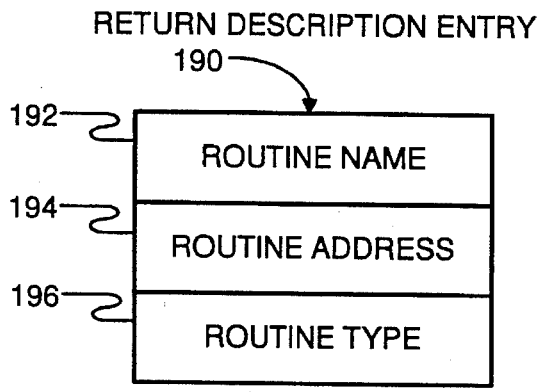
FIG. 10 is a functional block diagram that shows the routine description entry of the history queue of the storage description table of the static data file created and used by the system.

Referring to FIG. 9, the history queue 142 in the storage description table 66 contains a number of routine description entries 190a–190n. As shown in FIG. 10, the routine description entry 190 contains several fields, including the routine name field 192, the contents of which identify the routine (which is uniquely identified by the address of the routine); the return address field 194, the contents of which indicate where to resume execution upon exiting the routine; and a return type field 196, the contents of which identify the return type (e.g., far and near returns as used in the Intel 8086 architecture).

Figure 11:
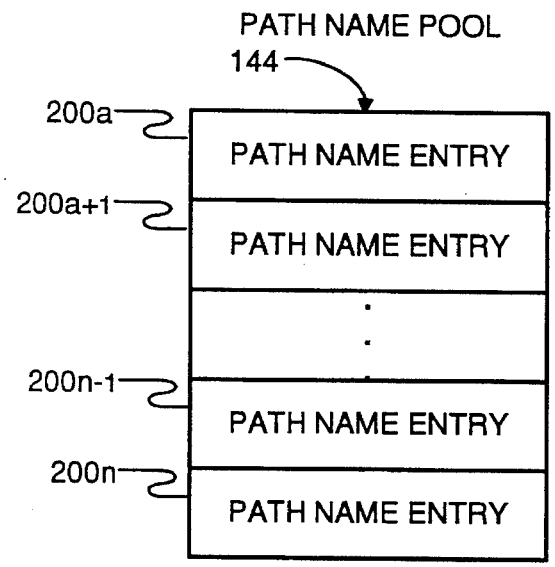
FIG. 11 is a functional block diagram that shows the path name pool of the storage description table of the static data file created and used by the system.

Referring to FIG. 11, the path name pool 144 in the storage description table 66 contains a number of path name entries 200a–200n. Each path name entry 200 identifies the name of a routine or path (which is uniquely identified by the address of the routine or path).

Figure 12:
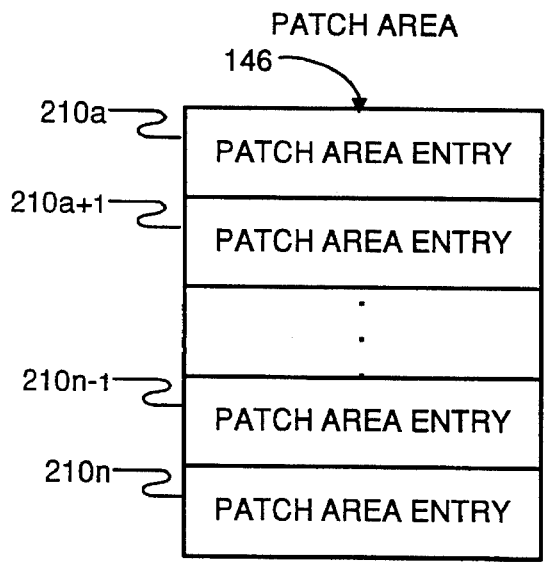
FIG. 12 is a functional block diagram that shows the patch area of the storage description table of the static data file created and used by the system.

Referring to FIG. 12, the patch area 146 in the storage description table 66 contains a number of patch area entries 210a–210n. Each patch area entry 210 identifies the instructions of the binary image 18 that the analyzer module 12 displace in order to insert the tracking code.

Figure 13:
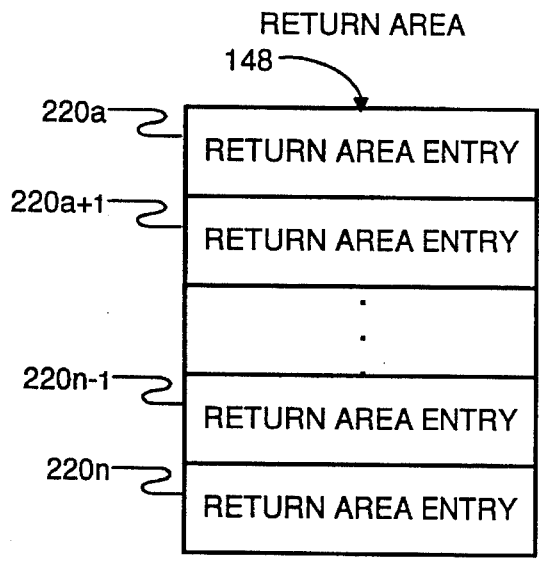
FIG. 13 is a functional block diagram that shows the return area of the storage description table of the static data file created and used by the system.
Figure 14:
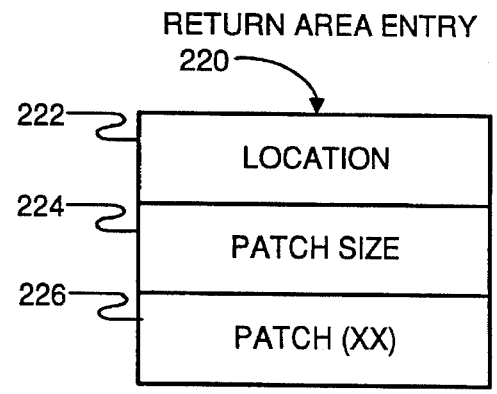
FIG. 14 is a functional block diagram that shows the return area entry of the return area of the storage description table of the static data file created and used by the system.

Referring to FIG. 13, the return area 148 in the storage description table 66 contains a number of return area entries 220a–220n. As shown in FIG. 14, the return area entry contains several fields including a location field 222, the contents of which identify an address in the binary image 18 where the patch starts; a patch size field 224, the contents of which identify the number of address units in the patch; a patch field 226, the contents of which identify the size of the address units in the patch.

Program Signature

The program signature file 24 is generated by the analyzer 12 for use by the post-processor 16. It contains information extracted from the binary image 18 that is used to interpret the information in the static data tables 26 generated by the kernel 14. The program signature file 24 also contains information that characterizes the shape of the binary image (e.g., the CRC of the program, and a reference to the complete routine address map). This information is stored in the dynamic data tables 28 and in the archived runs 36a–36n to allow the post processor 16 to compare different executions of the same binary image 18.

Referring to FIG. 15, the program signature file 24 contains a number of fields (including a version number field, a date and time field, a target computer name, an ADF file name, an ADF CRC, an ADF file size, and an ADF time stamp), information on the binary image (including its file name, 16 bit CRC, file size, and time stamp), information on the instrumented image (including its file name, 16-bit CRC, file size, and time stamp), and data on the static data file (including the file name, 16-bit CRC, file size, and time stamp).

The Kernel Module

The kernel module 14 is a specific implementation of a generic kernel because it must read, and possibly control, a timer in the target computer, as well as have low-level access to the subroutine call and interrupt mechanisms in the target computer. The kernel module 14 executes on the target computer concurrently with the instrumented image 22 and creates the dynamic data tables 28 which store the performance information of the target program.

There are two tracking mechanisms at work within the kernel module 14, namely interrupt insertion and direct call/jump insertion. Both techniques are well known methods of binding routines in separate modules. In the present invention, the user specifies which mechanism he wants to use or can let the analyzer decide based on characteristics of the binary image 18.

When either mechanism is inserted into the binary image 18, the code that was there is placed in the appropriate patch area entry 210 in the patch area 146 of the storage description table 66. In either case, it may be necessary, depending upon the processor, to change some of the instructions in the binary image 18 in order to create the instrumented image 22. For example, if the binary image 18 contains routines that use short returns, i.e., within the same 64K segment for an Intel 8086 processor, the same routines in the instrumented image 22 must be replaced with instructions to return to the kernel module 14 because the stack contents cannot be changed to include space for a long address since all offsets would then be skewed by two bytes.

In the case of interrupt insertion, the kernel module 14 replaces the target computer's interrupt handler with its own, and the analyzer module 12 inserts break points into the instrumented image 22. When the instrumented image 22 reaches a break point during execution, the interrupt causes a branch to the kernel module 14. The kernel module 14 records the routine name and return address in the history queue 142 in the storage description table 66, and places its own return address on the system stack instead of the calling routine's return address. This permits control to return to the kernel module 14, and not to the calling routine upon exiting the routine. After recording the necessary timing data, the kernel module 14 retrieves the original return address and returns control to the calling routine. An advantage of this method is that it requires little storage. A disadvantage, however, is that it can be slow since it relies on the target computer to process the interrupts.

The alternative is to insert a jump or subroutine call in the instrumented image 22 to branch to a routine in the kernel 14. The advantage to this approach is that it is faster because it avoids interrupt latency. Its disadvantage, however, is that it requires space in the kernel module 14 to save the return address and processor state.

Depending on which flags are set in the analyzer module 12, the kernel 14 tracks one or more aspects of execution. In one aspect, the kernel may determine the exclusive time spent in a routine, i.e., from entry to exit not including time spent in called routines. For example, when a routine A is called, the kernel reads and stores the clock value in the history queue for this instantiation of routine A. If routine A then calls routine B, the kernel reads and stores the clock value on entry to routine B and adds the difference to the exclusive total time for routine A. When routine B exits, the exclusive time for routine B is added to the inclusive time for routine A, and the exclusive time for routine A begins to track again until the next exit from A.

The Post Processor

The post processor module 16 executes on the host computer after the instrumented image 22 executes. It reads the ADF 20 for the target computer and the signature file 24. Based on the contents of the ADF and the signature file, the post processor combines the contents of the dynamic data tables 28 and static data tables 26 to create the combined static and dynamic tables 30. The post-processor 16 then submits the contents of the combined static and dynamic data tables 30 to the spreadsheet module 32, which displays and prints the contents of the combined static and dynamic data in various ways.

In addition, the post-processor 16 stores the binary image 18, the ADF 20, the dynamic data tables 28, and the combined static and dynamic data tables 30 for a series of executions in the archived runs 36a–36n. In this way, the post-processor is also able to compare various executions of binary images. For example, if a user receives an updated version of a program, he can run it and a previous version through the analyzer module, and use the post processor to compare the instrumented images in order to determine what tests must be redone.

The present invention is embodied in a software product developed by Integrity Systems, Inc. of Winchester, Mass. The programming language, compiler, and assembler used were Turbo C by Borland International. The product is designed to run on IBM PC and IBM PC compatible computers (i.e. 8086 architecture) having at least 256K of random access memory (RAM). A hard disk is recommended, though not required.

Other embodiments are within the following claims:
What is claimed is:
1. A digital data processing system for evaluating the performance of a computer program, said digital system comprising:

(a) a first computer comprising:

(i) means for selecting an architecture description file having definitions of boundaries;
(ii) means for identifying boundaries according to said definitions in said architecture description file, in a binary image of said computer program;
(iii) means for inserting at said identified boundaries tracking code that includes instructions leading to routines in a kernel program, said routines adapted for collection of runtime performance information, so that a modified binary image is created;

(b) a second computer comprising:
(i) means for running said kernel program including means for running said modified binary image;
respond to said tracking code in said modified binary image; and
means for collecting said runtime performance information as specified in said routines.

2. The system of claim 1 wherein said kernel program executes in real time, concurrent with execution of said modified binary image.

3. The digital data processing system of claim 1 wherein said second computer is further adapted to combine said performance information.

4. The digital data processing system of claim 1 further comprising a third computer comprising means for displaying said performance information.

5. The digital data processing system of claim 3 further comprising a third computer programmed to display said combined performance information.

6. The digital data system of claim 1 wherein said architecture description file further includes deinitions of program components selected from the group of regions and routines.

7. The digital data system of claim 6 wherein said first computing means further comprising means for inserting said tracking codes at said identified program components.

* * * * *

UNITED STATES PATENT AND TRADEMARK OFFICE
CERTIFICATE OF CORRECTION

PATENT NO. : 5,465,258
DATED : November 7, 1995
INVENTOR(S) : Steven E. Adams

It is certified that error appears in the above-indentified patent and that said Letters Patent is hereby corrected as shown below:

Column 10, line 11, please delete "deinitions"; and insert therefor -- definitions --.

Signed and Sealed this

Twentieth Day of February, 1996

Attest:

BRUCE LEHMAN

Attesting Officer

Commissioner of Patents and Trademarks